(12) United States Patent
Zhu et al.

(10) Patent No.: US 7,808,559 B2
(45) Date of Patent: Oct. 5, 2010

(54) SYSTEM AND METHOD FOR ACCUMULATIVE STILLNESS ANALYSIS OF VIDEO SIGNALS

(75) Inventors: Ge Zhu, Shanghai (CN); Edward Chen, Shanghai (CN); Zhengjun Gong, Shanghai (CN); Qing Yang, Shanghai (CN)

(73) Assignee: Huaya Microelectronics, Inc, San Jose, CA (US)

( * ) Notice: Subject to any disclaimer, the term of this patent is extended or adjusted under 35 U.S.C. 154(b) by 1574 days.

(21) Appl. No.: 11/046,582

(22) Filed: Jan. 28, 2005

(65) Prior Publication Data

US 2006/0023118 A1  Feb. 2, 2006

(30) Foreign Application Priority Data

Jul. 28, 2004  (CN)  ........................ 2004 1 00531863

(51) Int. Cl.
  *H04N 5/14*  (2006.01)
  *H04N 11/20*  (2006.01)
(52) U.S. Cl. ........................ 348/700; 348/448

(58) Field of Classification Search ............... 348/448, 348/700, 714, 452, 97, 911, 910, 608, 610, 348/446, 571, 459; 375/240, 240.16, 240.12
See application file for complete search history.

(56) References Cited

U.S. PATENT DOCUMENTS

| 6,307,888 | B1 * | 10/2001 | Le Clerc | 375/240.29 |
| 6,404,461 | B1 * | 6/2002 | Le Clerc | 348/700 |
| 2002/0050965 | A1 * | 5/2002 | Oda et al. | 345/87 |
| 2003/0011709 | A1 * | 1/2003 | Kasahara et al. | 348/452 |
| 2004/0070686 | A1 * | 4/2004 | Jung et al. | 348/448 |
| 2006/0146187 | A1 * | 7/2006 | Handjojo et al. | 348/448 |

* cited by examiner

*Primary Examiner*—Behrooz Senfi
(74) *Attorney, Agent, or Firm*—Silicon Valley Patent Group, LLP; Edward S. Mao (57) ABSTRACT

A method and system for accumulating stillness characteristics is presented. The method and system generates field stillness characteristics for a current pixel of a current field. The field stillness characteristic is accumulated with an accumulated stillness characteristic that corresponds to a pixel location of the current pixel. The accumulated stillness characteristic includes stillness information regarding previous pixels of previous fields in the same pixel location as the current pixel.

16 Claims, 7 Drawing Sheets

SYSTEM AND METHOD FOR
ACCUMULATIVE STILLNESS ANALYSIS OF
VIDEO SIGNALS

BACKGROUND OF THE INVENTION

1. Field of the Invention

The present invention relates to digital image and video processing. More specifically, the present invention relates to methods of providing accumulative stillness analysis information for multiple fields of a video stream.

2. Discussion of Related Art

Due to advancing semiconductor processing technology, integrated circuits (ICs) have greatly increased in functionality and complexity. With increasing processing and memory capabilities, many formerly analog tasks are being performed digitally. For example, images, audio and even full motion video can now be produced, distributed, and used in digital formats.

Figure 1:
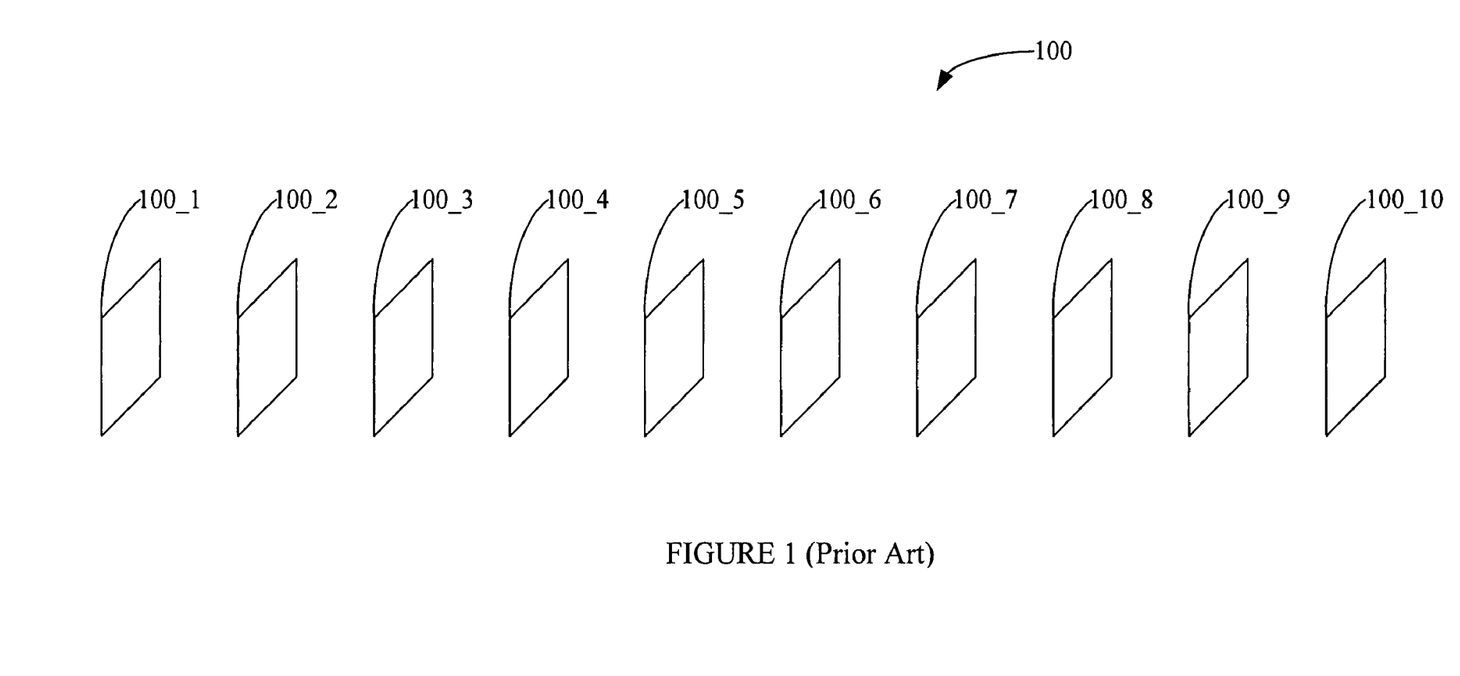
FIG. 1 is an illustration of an interlaced video stream.

FIG. 1 is an illustrative diagram of a portion of interlaced digital video stream 100 most often used in television systems. Interlaced digital video stream 100 comprises a series of individual fields 100_1 to 100_N, of which the first ten fields are shown. Even fields contain even numbered rows while odd fields contain odd numbered rows. For example if a frame has 400 rows of 640 pixels, the even field would contains rows 2, 4, . . . 400 and the odd field would contains rows 1, 3, 5, . . . 399 of the frame. In general for an interlaced video stream each field is formed at a different time. For example, an interlaced video capture device (e.g. a video camera) captures and stores the odd scan lines of a scene at time T as field 100_1, then the video capture device stores the even scan lines of a scene at time T+1 as field 100_2. The process continues for each field. Two main interlaced video standards are used. The PAL (Phase Alternating Line) standard, which is used in Europe, displays 50 fields per seconds and the NTSC (National Television System Committee) standard, which is used in the United States, displays 60 fields per seconds.

Interlaced video systems were designed when bandwidth limitations precluded progressive (i.e., non-interlaced) video systems with adequate frame rates. Specifically, interlacing two 25 fps fields achieved an effective 50 frame per second frame rate because the phosphors used in television sets would remain "lit" while the second field is drawn. Progressive video streams use complete frames, including both the even and odd scan lines instead of fields. Because progressive scan provides better display quality, computer systems, which were developed much later than the original television systems, use progressive scan display systems. Furthermore, many modern televisions and television equipment are being developed to use progressive video streams. To maintain compatibility with existing interlaced video systems, modern progressive systems use deinterlacing techniques to convert interlaced video streams into progressive video streams.

Figure 2A:
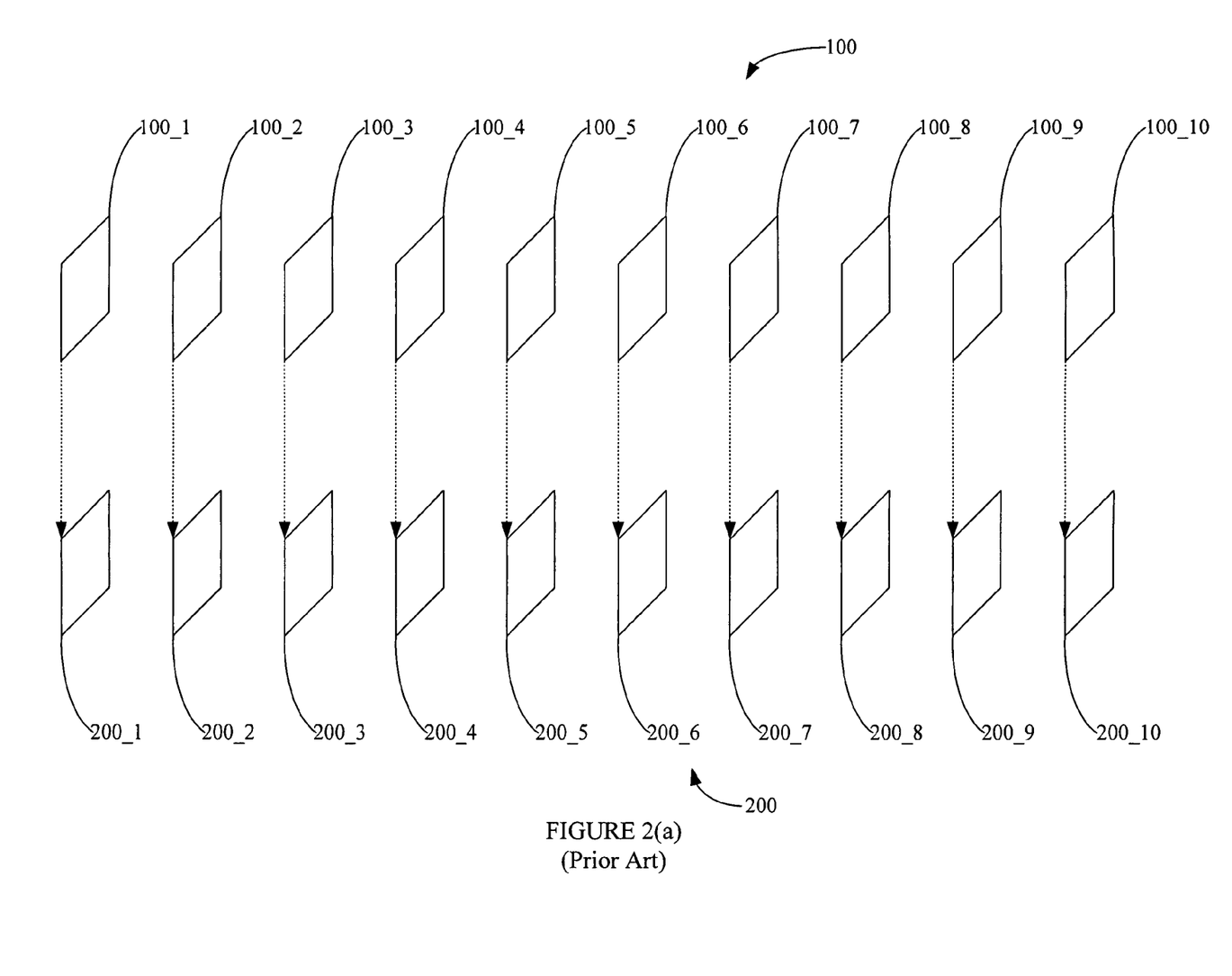
FIGS. 2(a) and 2(b) illustrate a deinterlacing process to form a de-interlaced video stream.
Figure 2B:
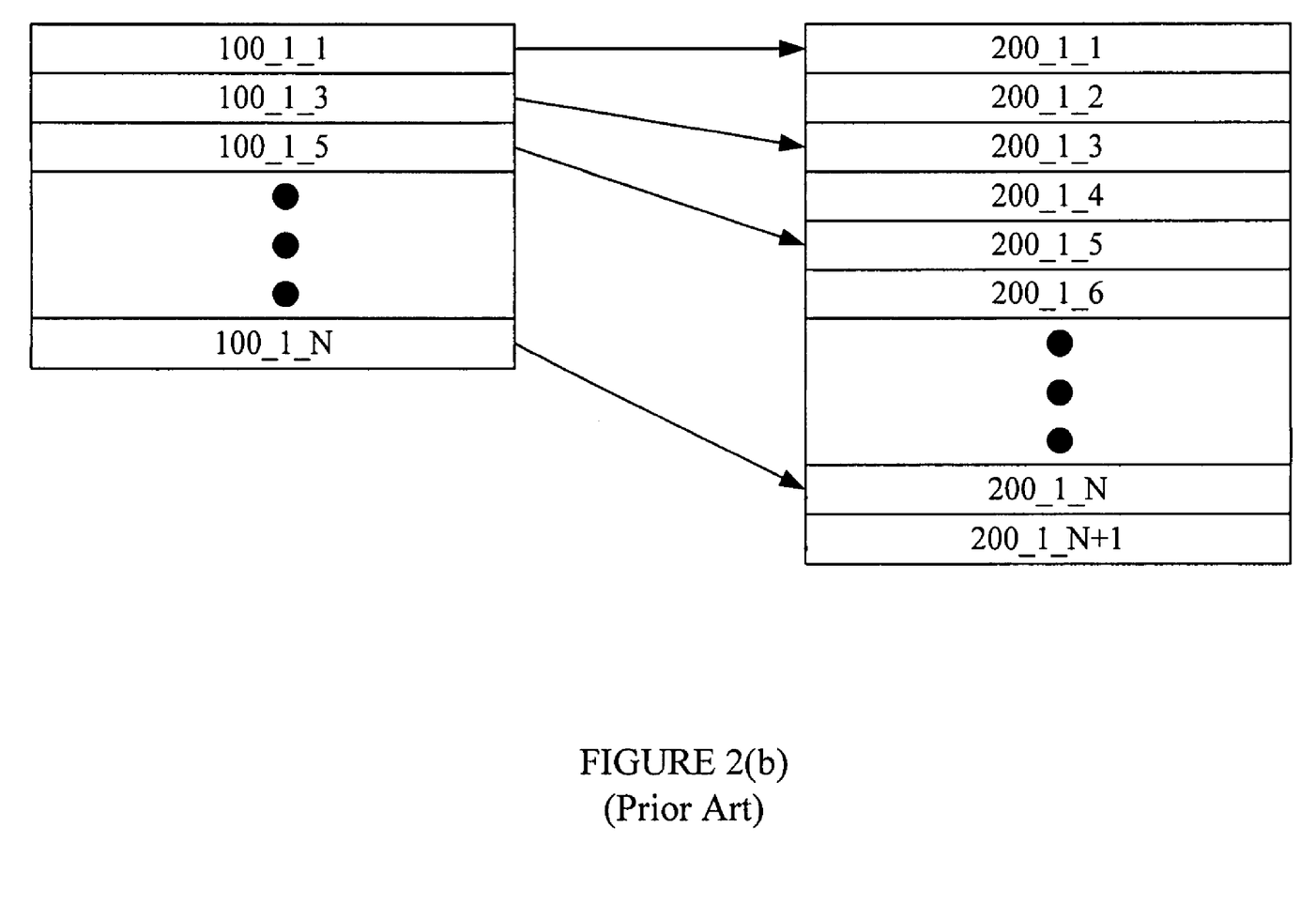

FIGS. 2(a) and 2(b) illustrate a typical method of generating a progressive video stream 200 from an interlaced video stream 100. Specifically each field 100_X of interlaced video stream 100 is converted to a frame 200_X of progressive video stream 200. The conversion of a field to a frame is accomplished by generating the missing scan lines in each frame by copying or interpolating from the scan lines in the field. For example, as illustrated in FIG. 2(b) field 100_1 having odd scan lines 100_1_1, 100_1_3, 100_1_5, . . . 100_1_N, is converted into a frame 200_1 by copying scan lines 100_1_X as odd scan lines 200_1_X, where X is an odd number and creating even scan lines 200_1_Y, where Y is an even number. Even scan lines 200_1_Y can be created by copying the preceding odd scan line 200_1_Y−1. This technique is commonly known as line repeat. Better results can be obtained using various interpolation schemes to generate the missing scan lines. For example, one interpolation scheme simply averages odd scan line 200_1_Y−1 with odd scan line 200_1_Y+1 to generate even scan line 200_1_Y. Other interpolation schemes may use weighted averages or other more complicated ways to combine data from the existing scan lines to generate the missing scan lines. Another normal mode deinterlacing technique known as 3D deinterlacing involves generating the missing scan lines by interpolating the missing pixels using data from adjacent fields. Conversion of fields into frames is not an integral part of the present invention. The principles of the present invention can easily be adapted for use with any form of field to frame conversion.

In most deinterlacing techniques information regarding the "stillness" of the pixels in the fields are used to improve the resulting video frame. Various techniques can be used to determine whether a pixel is a "still pixel". In general a still pixel detection unit determines a stillness characteristic for each pixel in a field. For example, a pixel in a field 100_4 (FIG. 1) is analyzed with respect to a corresponding pixel (and surrounding pixels) in a field 100_2 to calculate a stillness characteristic. Field 100_3 is usually not used because field 100_3 contains odd scan lines that do not correspond to the even scan lines that are in field 100_4. In general stillness characteristics are calculated between a field 100_X and a field 100_(X−2).

Some still pixel detection units simply assign a Boolean value as the stillness characteristic. For example a binary value of 1 indicates a pixel is a still pixel, whereas a binary value of 0 indicates a pixel is a non-still pixel. In other still pixel detection units the stillness characteristic can take on a range of values that indicate different levels of stillness.

The stillness characteristic only provides stillness information of a pixel relative to the most recent field of the same type (i.e., odd or even). However in some deinterlacing systems, more accurate deinterlacing can be achieved if additional stillness information such as the stillness of a pixel through more than two fields is provided.

Hence, there is a need for a method or system that can provide stillness information over multiple fields.

SUMMARY

Accordingly, the present invention provides a method and system for accumulating stillness characteristics across multiple video fields of a video stream. Specifically, in one embodiment of the present invention, a stillness accumulation system includes a video buffer that receives the video stream, a still pixel detection system that generates field stillness characteristics for a current pixel of a current field, and a stillness accumulation unit that receives the field stillness characteristic of the current pixel and accumulates the field stillness characteristic with an accumulated stillness characteristic that corresponds with the pixel location of the current pixel. The accumulated stillness characteristic includes stillness information of previous pixels in the same pixel location as the current pixel.

In some embodiments of the present invention, the stillness accumulation unit includes a stillness accumulation counter that increments the accumulated stillness characteristic when the field stillness characteristic of the current pixel indicates that the current pixel is a still pixel. In other embodiments of the present invention, the stillness accumulation unit includes a stillness accumulation adder that adds the field stillness characteristic of the current pixel to the accumulated stillness characteristic. In still other embodiments of the present invention, the stillness accumulation unit includes a stillness accumulation register that stores the field stillness characteristic of the current pixel in the accumulated stillness characteristic.

The present invention will be more fully understood in view of the following description and drawings.

DETAILED DESCRIPTION

As explained above, stillness information is often used in deinterlacing systems. The present invention accumulates stillness information from multiple video fields so that deinterlacing systems (or other systems using stillness information, such as noise reduction systems) can provide more accurate results. Thus, the actual deinterlacing techniques are not an integral part of the present invention. Furthermore, the accumulated stillness information generated by the present invention can be used with a variety of deinterlacing systems (as well as other systems). For example the video de-interlacing system disclosed in U.S. patent application Ser. No. 10/659,772, filed Sep. 9, 2003, entitled "MIXED 2D AND 3D DE-INTERLACER" by Zhu, can be used with the present invention.

In addition the methods, systems and techniques used to calculate a stillness characteristic of a current pixel in a current field with respect to a previous field of the same field type is not an integral part of the present invention. Specifically, the present invention accumulates stillness characteristics, which can be generated using a variety of different methods. For example, the still pixel detection unit disclosed in U.S. patent application Ser. No. 10/659,038-3279, filed Sep. 9, 2003, entitled "Still Pixel Detection Using Multiple Windows and Thresholds" by Zhu et al., which is incorporated herein by reference; can be used for still pixel detection.

Figure 3:
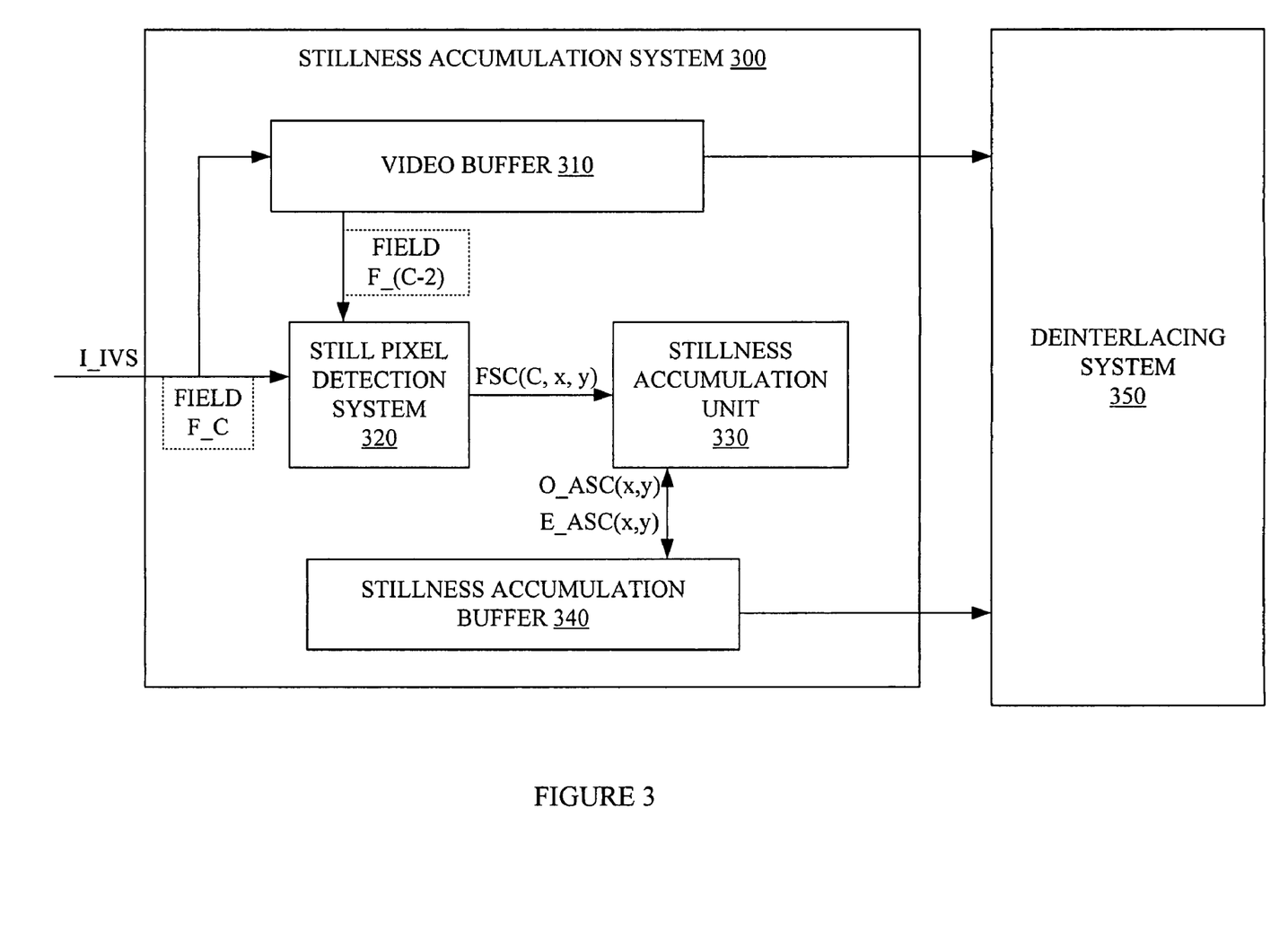
FIG. 3 is a simplified block diagram of a stillness accumulation system coupled to a deinterlacing system.

FIG. 3 is a block diagram of a stillness accumulation system 300 in accordance with one embodiment of the present invention. Stillness accumulation system 300 includes a video buffer 310, a still pixel detection system 320, a stillness accumulation unit 330, and a stillness accumulation buffer 340. FIG. 3 illustrates stillness accumulation system 300 with a deinterlacing system 350. However, stillness accumulation system 300 could be used with other video processing systems, such as a noise reduction system. Deinterlacing system 350 reads fields from video buffer 310 and obtains accumulated stillness characteristics (described below) from stillness accumulation buffer 340. As explained above, deinterlacing system 350 is not an integral part of the present invention and stillness accumulation system 300 can be used with a variety of deinterlacing systems. Furthermore, as explained above, the detailed implementation of still pixel detection system 320 is also not an integral part of the present invention. A variety of still pixel detection system can be used in stillness accumulation system 300.

Stillness accumulation system 300 receives an interlaced input video stream I_IVS having multiple fields. For clarity, the current field of interlaced input video stream I_IVS is denoted as "field F_C" or "current field F_C". Fields which preceded current field F_C are referenced as "field F_(C-X)", where X is an integer signifying that field F_(C-X) preceded current field F_C by X fields. Thus, field F_(C-1) is the field directly before current field F_C and field F_(C-2) preceded current field F_C by 2 fields. Thus, current field F_C and field F_(C-2) are of the same field type (i.e., odd or even).

Incoming fields of interlaced input video stream I_IVS are stored in video buffer 310. Due to the high cost of large memory buffers, video buffer 310 stores only a few recent fields. For the embodiment of FIG. 3, video buffer 310 includes three field buffers and is used as a circular buffer. Thus, the first field (i.e. field F_1) of input interlaced video stream I_IVS is written into a first field buffer, the second field (i.e. field F_2) of input interlaced video stream I_IVS is written into a second field buffer, the third field (i.e. field F_3) of input interlaced video stream I_IVS is written into a third field buffer. Then the fourth field of input interlaced video stream I_IVS is written into the first field buffer, the fifth field of input interlaced video stream I_IVS is written into the second field buffer, the sixth field of input interlaced video stream I_IVS is written into the third field buffer, and so forth. Thus, in general video buffer 310 contains the three most recent fields from input interlaced video stream I_IVS. However in certain situations, additional field buffers may be included to avoid read/write memory contentions. For clarity the three fields are referenced as current field F_C, field F_(C-1) and field F_(C-2). Stillness accumulation system 300 generally uses various field pointers to track which field buffer contains current field F_C, field F_(C-1), and field F_(C-2). Circular buffers are well known in the art and are typically implemented with various pointers to allow reading and writing at desired field locations.

As current field F_C is stored in video buffer 310, still pixel detection system 320 calculates a field stillness characteristic FSC(C, x, y) for each pixel p(x, y) of current field F_C. In general field stillness characteristic FSC(C, x, y) is calculated using information from current field F_C and field F_(C-2), which is of the same field type (i.e. odd or even) as current field F_C. In some embodiment of still pixel detection system 320, field stillness characteristic FSC(C, x, y) is a binary value that indicates whether pixel p(x, y) in field F_C is a "still" pixel. Specifically, field stillness characteristic FSC(C, x, y) is set to a still pixel logic state (SPLS) (e.g., logic high) when pixel P(x, y) is a still pixel. Otherwise field stillness characteristic FSC(C, x, y) is set to a non-still pixel logic state (NSPLS) (e.g. logic low). In other embodiments of still pixel detection system 320, field stillness characteristic FSC(C, x, y) can take on one of a range of values (typically, 0 to a maximum value FSC_MAX) indicating various levels of stillness. In general low values of field stillness characteristic FSC(C, x, y) indicates that pixel P(x, y) of field F_C is not very still as compared to pixel p(x, y) of field F_(C-2). Conversely large values of field stillness characteristic FSC(C, x, y) indicates that pixel P(x, y) of field F_C is mostly still as compared to pixel p(x, y) of field F_(C-2).

Stillness accumulation unit 330 receives field stillness characteristic FSC(C, x, y) from still pixel detection system 320 and accumulates field stillness characteristic FSC(C, X, y) with the corresponding accumulated stillness characteristic stored in accumulated stillness buffer 340. Specifically, if current field F_C is an odd field (i.e., contains odd scan lines), stillness accumulation unit 330 reads the current value of odd accumulated stillness characteristic O_ASC(x, y) from stillness accumulation buffer 340 and generates an updated value for odd accumulated stillness characteristic O_ASC(x, y) by accumulating field stillness characteristic FSC(C, x, y) with the current value of odd accumulated stillness characteristic O_ASC(x, y). If current field F_C is an even field (i.e., contains even scan lines), stillness accumulation unit 330 reads the current value of even stillness characteristic E_ASC(x, y) from stillness accumulation buffer 340 and generates an updated value for even accumulated stillness characteristic E_ASC(x, y) by accumulating field stillness characteristic FSC(C, x, y) with the current value of even accumulated stillness characteristic E_ASC(x, y). The updated values are written back into stillness accumulation buffer 340.

One key distinction between field stillness characteristics and accumulated stillness characteristics is that field stillness characteristics are generated for each pixel location of each field. However, only one accumulated stillness characteristics is used for each pixel location. Thus, the process of accumulating field stillness characteristics into accumulated stillness characteristics greatly reduces memory requirement.

For conciseness operations on odd fields and even fields are not separately described because operations on even fields are virtually identical with operation on odd fields. Specifically, operation of the stillness accumulation units are described with a generic accumulated stillness characteristic ASC(x, y) rather than with odd accumulated stillness characteristic O_ASC(x, y) and even accumulated stillness characteristic E_ASC(x, y). One skilled in the art can easily apply the teachings described below for both odd fields and even fields. Furthermore, one skilled in the art can easily apply the teachings described below for accumulating stillness information of progressive video streams. Instead of accumulating field stillness characteristics, frame stillness characteristics are accumulated for progressive scan videos. Accumulated stillness information of progressive video streams can be useful for various video processing tasks such as noise reduction.

Figure 4:
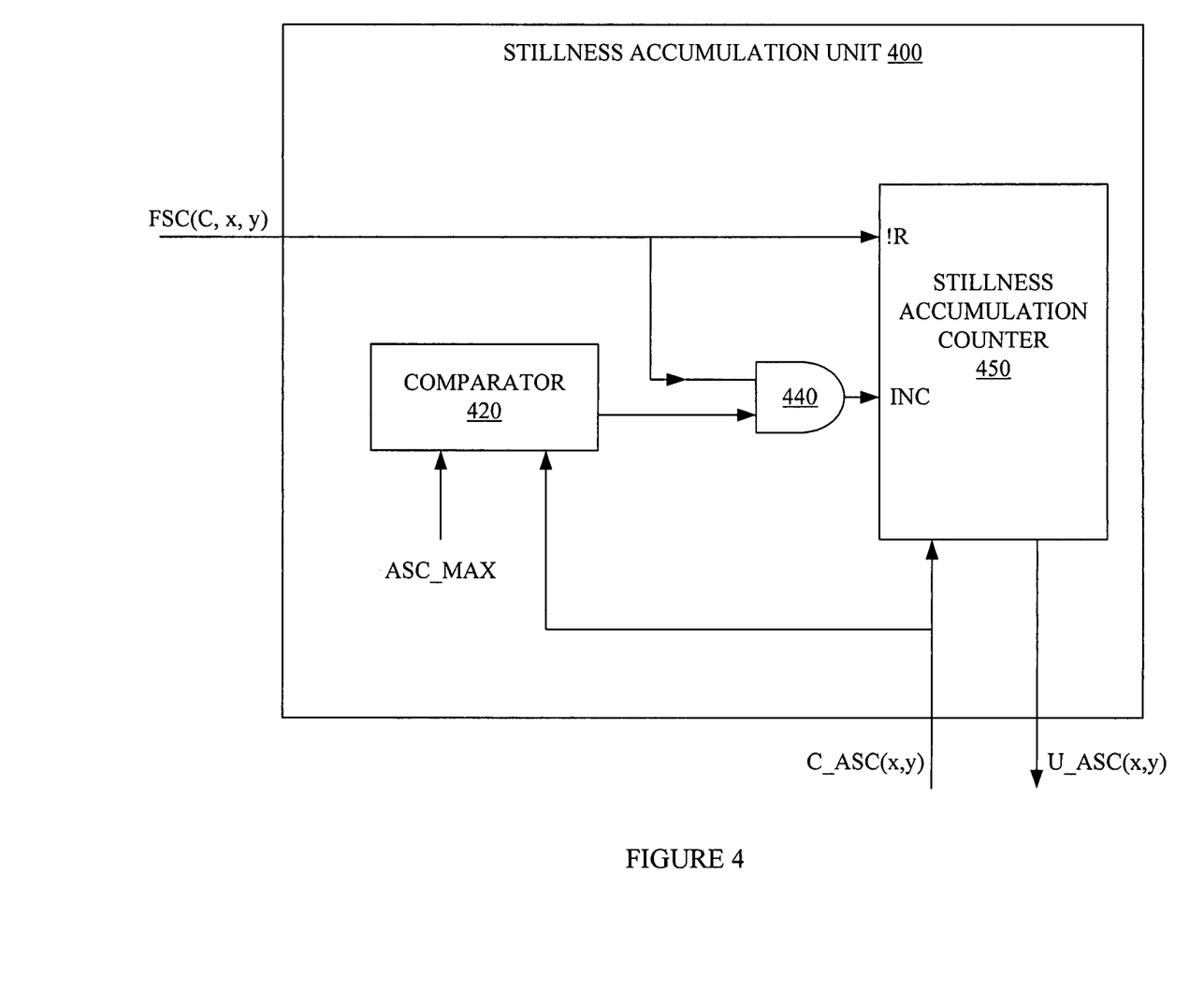
FIG. 4 is a simplified block diagram of a stillness accumulation unit in accordance with one embodiment of the present invention.

The process of accumulating the field stillness characteristics can vary depending on the nature of the field stillness characteristic generated by still pixel detection system 320. FIG. 4 is a simplified block diagram of a stillness accumulation unit 400 suitable for use with binary field stillness characteristics (i.e. field stillness characteristic FSC(C, x, y) is at a still pixel logic state (SPLS) when pixel p(x, y) in field F_C is a still pixel and is at a non-still pixel logic state (NSPLS) when pixel p(x, y) in field F_C is not a still pixel). In the embodiment of FIG. 4, still pixel logic state SPLS is logic high.

The accumulated stillness characteristics generated by stillness accumulation unit 400 represents the number of fields in which a pixel has been still. Specifically, an accumulated stillness characteristic ASC(x, y) equal to 0, indicates that pixel p(x, y) of current frame F_C is not a still pixel. An accumulated stillness characteristic ASC(x, y) equal to 1, indicates that pixel p(x, y) of current frame F_C is a still pixel relative to pixel P(x, y) of frame F_(C-2). An accumulated stillness characteristic ASC(x, y) equal to 2, indicates that pixel p(x, y) of current frame F_C is a still pixel relative to pixel P(x, y) of frame F_(C-2) and that pixel P(x, y) of frame F_(C-2) is a still pixel relative to pixel p(x, y) of frame F_(C-4). For the embodiment of FIG. 4, an accumulated stillness characteristic ASC(x, y) equal to a positive integer number N, indicates that pixel p(x, y) has been a still pixel since field F_(C-2*N). However, to reduce the size of accumulated stillness buffer 340 (FIG. 3), accumulated stillness characteristic is limited to a maximum accumulated stillness characteristic value ASC_MAX.

Stillness accumulation unit 400 includes a comparator 420, an AND gate 440, and a stillness accumulation counter 450. For each pixel p(x, y) in current field F_C, stillness accumulation counter 450 is loaded with the current value of accumulated stillness characteristic ASC(x, y) and provides an updated value of accumulated stillness characteristic ASC(x, y). For clarity, the current value of accumulated stillness characteristic ASC(x, y) stored in stillness accumulation buffer is denoted as "current accumulated stillness characteristic C_ASC(x, y)." Conversely, the updated value calculated for accumulated stillness characteristic ASC(x, y) is denoted as "updated accumulated stillness characteristic U_ASC(x, y)." Updated accumulated stillness characteristic U_ASC(X, y) is written back into stillness accumulation buffer 340 (FIG. 3). In actual implementation, most embodiments of the present invention would use a bi-directional bus to read current accumulated stillness characteristic C_ASC(x, y) and to store updated accumulated stillness characteristic U_ASC(x, y).

Depending on the values of field stillness characteristic FSC(C, x, y) and current accumulated stillness characteristic C_ASC(x, y), the value in stillness accumulation counter 450 is reset to zero, incremented, or not changed. Specifically, when field stillness characteristic FSC(C, x, y) is at the not still pixel logic level (i.e., logic low), which indicates that pixel p(x, y) of field F_C is not a still pixel relative to pixel P(x, y) of field F_(C-2), updated accumulated stillness characteristic U_ASC(x, y) is set equal to zero. When field stillness characteristic FSC(C, x, y) is at the still pixel logic level (i.e., logic high), which indicates that pixel p(x, y) of field F_C is a still pixel relative to pixel P(x, y) of field F_(C-2) and current accumulated stillness characteristic C_ASC(x, y) is less than accumulated stillness characteristic maximum value ASC_MAX then updated accumulated stillness characteristic U_ASC(x, y) is set equal to current accumulated stillness characteristic C_ASC(x, y) plus one. However, if current accumulated stillness characteristic ASC(x, y) is equal to accumulated stillness characteristic maximum value ASC_MAX when field stillness characteristic FSC(C, x, y) is at the still pixel logic level (i.e., logic high) then the updated accumulated stillness characteristic U_ASC(x, y) is set equal to accumulated stillness characteristic maximum value ASC_MAX.

Accordingly, comparator 420 compares the current accumulated stillness characteristic C_ASC(x, y) with accumulated stillness characteristic maximum value ASC_MAX. When the current accumulated stillness characteristic C_ASC(x, y) is less than accumulated stillness characteristic maximum value ASC_MAX, comparator 420 outputs a logic high to an input terminal of AND gate 440. Otherwise, comparator 420 outputs a logic low. The other input terminal of AND gate 440 receives field stillness characteristic FSC(C, x, y) and the output terminal of AND gate 440 is coupled to an increment terminal of stillness accumulation counter 450. Thus, stillness accumulation counter 450 is incremented when field stillness characteristic FSC(C, x, y) is at the still pixel logic level (i.e., logic high) and current accumulated stillness characteristic C_ASC(x, y) is less than accumulated stillness characteristic maximum value ASC_MAX. Stillness accumulation counter 450 also includes an active low reset terminal !R which receives field stillness characteristic FSC (C, x, y). When field stillness characteristic FSC(C, x, y) is at the not still pixel logic level (i.e., logic low) stillness accumulation counter 450 is reset to zero. Stillness accumulation counter 450 provides updated accumulated stillness characteristic U_ASC(x, y) to stillness accumulation buffer 340.

Figure 5:
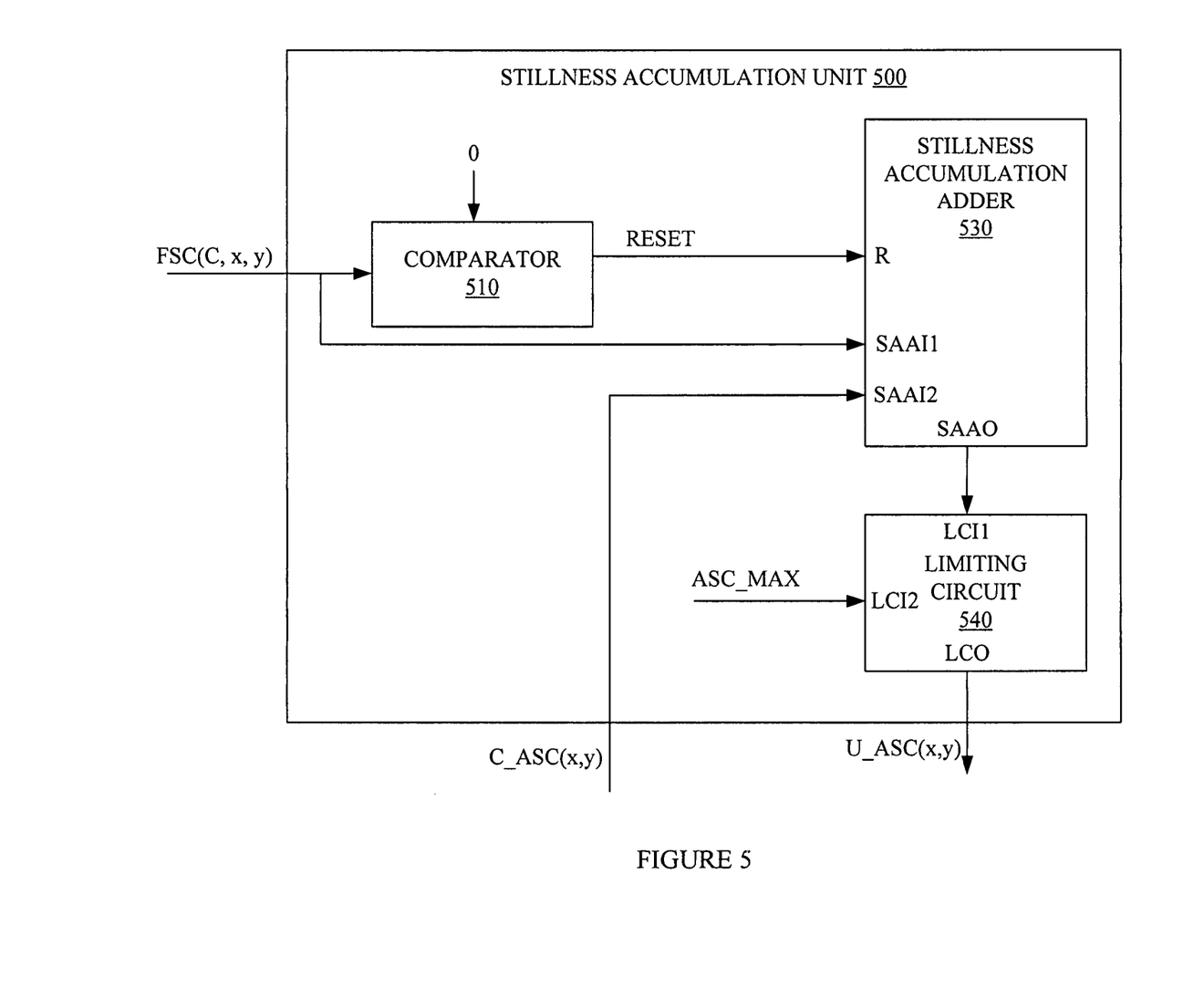
FIG. 5 is a simplified block diagram of a stillness accumulation unit in accordance with a second embodiment of the present invention.
Figure 6:
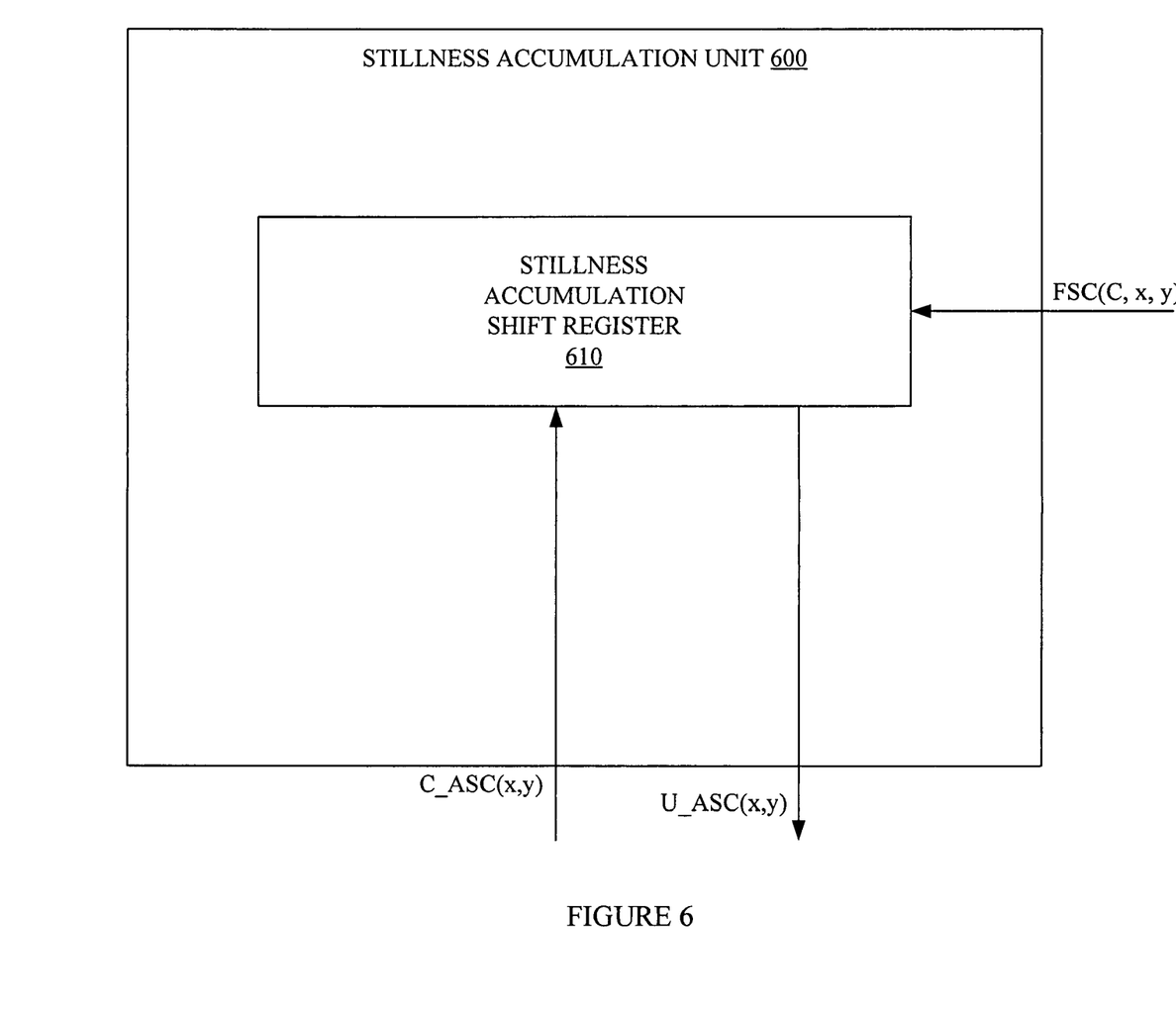
FIG. 6 is a simplified block diagram of a stillness accumulation unit in accordance with a third embodiment of the present invention.

Different methods of accumulation can be used when field stillness characteristic FSC(C, x, y) can be one of a range of stillness values. FIGS. 5 and 6 are simplified block diagrams of stillness accumulation units in accordance with different embodiments of the present invention that are well suited for field stillness characteristics that can be one of a range of stillness values.

Specifically, FIG. 5 is a simplified block diagram of a stillness accumulation unit 500 that includes a comparator 510, a stillness accumulation adder 530, and a limiting circuit 540. Stillness accumulation unit 500 accumulates field stillness characteristics by adding non-zero values of field stillness characteristic FCS(C, x, y) to current accumulated stillness characteristic C_ASC(x, y). However if the sum of field stillness characteristic FCS(C, x, y) with current accumulated stillness characteristic C_ASC(x, y) is greater than accumulated stillness characteristic maximum value ASC_MAX, updated accumulated stillness characteristic U_ASC(x, y) is limited to accumulated stillness characteristic maximum value ASC_MAX. Furthermore, if field stillness characteristic FSC(C, x, y) is equal to zero then updated accumulated stillness characteristic U_ASC(x, y) is reset to zero. Updated accumulated stillness characteristic U_ASC(x, y) is written back to stillness accumulation buffer 340 (FIG. 3).

Thus, comparator 510 compares field stillness characteristic FSC(C, x, y) with zero to generates a reset signal RESET that is set to logic high when field stillness characteristic FSC(C, x, y) is equal to 0 and logic low otherwise. Reset signal RESET is applied to a reset terminal R of stillness accumulation adder 530. Thus stillness accumulation adder 530 is reset to zero when field stillness characteristic FSC(C, x, y) is equal to zero. Stillness accumulation adder 530 has a first input port SAAI1 coupled to receive field stillness characteristic FSC(C, x, y), a second input port SAAI2 coupled to receive the current accumulated stillness characteristic C_ASC(x, y), and an output port SAAO that provides the sum of the values at input ports SAAI1 and SAAI2. The output of stillness accumulation adder 530 is applied to a first input port LCI1 of limiting circuit 540. Limiting circuit also has a second input port LCI2 which is coupled to receive accumulated stillness characteristic maximum value ASC_MAX and an output port LCO, which provides the smaller of the values at input ports LCI1 and LCI2 of limiting circuit 540. The output of limiting circuit 540 provides updated accumulated stillness characteristic U_ASC(x, y), which is stored in stillness accumulation buffer 340 (FIG. 3).

Accumulated stillness characteristic values generated by stillness accumulation unit 500 provide a measure of stillness since the last non-still pixel at a particular pixel location. For example if field stillness characteristic FSC(C, x, y) can take on a value from 0 to 5 and accumulated stillness characteristic maximum value ASC_MAX is equal to 30, then an accumulated stillness value could give information regarding the stillness of pixel p(x, y) through at least 7 fields of the same field type (which would be 13 consecutive fields). Specifically, assuming that pixel p(x, y) has been completely still for at least the last 6 fields of the same field type then accumulated stillness characteristic ASC(x, y) would equal 30. However, the same value for accumulated stillness characteristic ASC (x, y) could be obtained from 16 consecutive fields of the same field type in which the field stillness characteristic of each field at pixel p(x, y) was equal to 2, which denote much less stillness than a field stillness characteristic value of 5. Even with this limitation the method used by accumulated stillness accumulation unit 500 is still very useful in many situations. For example, in video streams that are unlikely to have many consecutive fields (of the same type) having still pixels the accumulated stillness characteristics would be frequently reset to zero. Thus, large values of accumulated stillness characteristics are more likely to indicate very still pixels.

FIG. 6 is a block diagram of a stillness accumulation unit 600 that preserves the field stillness characteristics of a number of fields. For the embodiment of FIG. 6, field stillness characteristics are coded using F bits and accumulation stillness characteristics are coded using N*F bits. When field stillness characteristic FSC(C, x, y) is available accumulated stillness characteristic ASC(x, y) is updated by storing field stillness characteristic FSC(C, x, y) within accumulated stillness characteristic ASC(x, y). To limit the size of accumulated stillness characteristic ASC(x, y), field stillness characteristics of previous fields can be removed. Specifically, for the embodiment of FIG. 6, stillness accumulation unit 600 includes a stillness accumulation shift register 610. As each field stillness characteristic FSC(C, x, y) is provided to stillness accumulation unit 600, stillness accumulation unit 600 loads current accumulated stillness characteristic C_ASC(x, y) into stillness accumulation shift register 610. Then, stillness accumulation shift register is shifted F bits to the left while filling the F rightmost bits with the bits of field stillness characteristic FSC(C, x, y). After F shifts stillness accumulation shift register 610 includes field stillness characteristics FSC(C, x, y), FSC(C-2, x, y) . . . FSC(C-2*(N-1), x, y). The value in stillness accumulation shift register 610 is written back to accumulation buffer 340 (FIG. 3) as updated accumulated stillness characteristic U_ASC(x, y).

In the various embodiments of the present invention, novel structures have been described for accumulating stillness characteristics. By accumulating the fields stillness characteristics additional stillness information can be provided to other systems, such as deinterlacing systems, to improve picture quality. The various embodiments of the structures and methods of this invention that are described above are illustrative only of the principles of this invention and are not intended to limit the scope of the invention to the particular embodiments described. For example, in view of this disclosure those skilled in the art can define other field stillness characteristics, accumulated stillness characteristics, stillness accumulation units, stillness accumulation shift registers, stillness accumulation adders, stillness accumulation counters, stillness accumulation systems, still pixel detection systems, video buffers, stillness accumulation buffers, and so forth, and use these alternative features to create a method, circuit, or system according to the principles of this invention. Thus, the invention is limited only by the following claims.

What is claimed is:

1. A method of storing stillness information for a video stream having a plurality of fields each having a plurality of pixels, the method comprising:

generating a field stillness characteristic for a current pixel of a current field; and accumulating the field stillness characteristic of the current pixel of the current field with an accumulated stillness characteristic corresponding to a pixel location of the current pixel, wherein the accumulated stillness characteristic includes stillness information regarding at least one previous pixel of a previous field in the same pixel location as the current pixel in the current field; and wherein the accumulating the field stillness characteristic of the current pixel of the current field with an accumulated stillness characteristic corresponding to a pixel location of the current pixel comprises adding the field stillness characteristic to the accumulated stillness characteristic when the field stillness characteristic indicates that the current pixel is a still pixel.

2. The method of claim 1, wherein the current pixel is a still pixel if the field stillness characteristic is greater than zero.

3. The method of claim 1, wherein the accumulating the field stillness characteristic of the current pixel of the current field with an accumulated stillness characteristic corresponding to a pixel location of the current pixel further comprises setting the accumulated stillness characteristic equal to an accumulated stillness maximum value when the accumulated stillness characteristic is greater than the accumulated stillness maximum value.

4. The method of claim 1, wherein the accumulating the field stillness characteristic of the current pixel of the current field with an accumulated stillness characteristic corresponding to a pixel location of the current pixel further comprises setting the accumulated stillness characteristic equal to zero when the field stillness characteristic indicates that the current pixel is a non-still pixel.

5. The method of claim 4, wherein the current pixel is a non-still pixel when the field stillness characteristic of the current pixel is equal to zero.

6. The method of claim 1, wherein the accumulating the field stillness characteristic of the current pixel of the current field with an accumulated stillness characteristic corresponding to a pixel location of the current pixel comprises:
reading a current value of the accumulated stillness characteristic;
calculating an updated value of the accumulated stillness characteristic; and
storing the updated value of the accumulated stillness characteristic.

7. A system of storing stillness information for a video stream having a plurality of fields each having a plurality of pixels, the system comprising:
means for generating a field stillness characteristic for a current pixel of a current field; and
means for accumulating the field stillness characteristic of the current pixel of the current field with an accumulated stillness characteristic corresponding to a pixel location of the current pixel, wherein the accumulated stillness characteristic includes stillness information regarding at least one previous pixel of a previous field in the same pixel location as the current pixel in the current field; and
wherein the means for accumulating the field stillness characteristic of the current pixel of the current field with an accumulated stillness characteristic corresponding to a pixel location of the current pixel comprises means for adding the field stillness characteristic to the accumulated stillness characteristic when the field stillness characteristic indicates that the current pixel is a still pixel.

8. The system of claim 7, wherein the current pixel is a still pixel if the field stillness characteristic is greater than zero.

9. The system of claim 7 wherein the means for accumulating the field stillness characteristic of the current pixel of the current field with an accumulated stillness characteristic corresponding to a pixel location of the current pixel further comprises means for setting the accumulated stillness characteristic equal to an accumulated stillness maximum value when the accumulated stillness characteristic is greater than the accumulated stillness maximum value.

10. The system of claim 7, wherein the means for accumulating the field stillness characteristic of the current pixel of the current field with an accumulated stillness characteristic corresponding to a pixel location of the current pixel further comprises means for setting the accumulated stillness characteristic equal to zero when the field stillness characteristic indicates that the current pixel is a non-still pixel.

11. The system of claim 10, wherein the current pixel is a non-still pixel when the field stillness characteristic of the current pixel is equal to zero.

12. The system of claim 7, wherein the means for accumulating the field stillness characteristic of the current pixel of the current field with an accumulated stillness characteristic corresponding to a pixel location of the current pixel comprises:
means for reading a current value of the accumulated stillness characteristic;
means for calculating an updated value of the accumulated stillness characteristic; and
means for storing the updated value of the accumulated stillness characteristic.

13. A method of storing stillness information for a video stream having a plurality of frames each having a plurality of pixels, the method comprising:
generating a frame stillness characteristic for a current pixel of a current frame; and
accumulating the frame stillness characteristic of the current pixel of the current frame with an accumulated stillness characteristic corresponding to a pixel location of the current pixel, wherein the accumulated stillness characteristic includes stillness information regarding at least one previous pixel of a previous frame in the same pixel location as the current pixel in the current frame; and
wherein the accumulating the frame stillness characteristic of the current pixel of the current frame with an accumulated stillness characteristic corresponding to a pixel location of the current pixel comprises adding the frame stillness characteristic to the accumulated stillness characteristic when the frame stillness characteristic indicates that the current pixel is a still pixel.

14. The method of claim 13, wherein the accumulating the frame stillness characteristic of the current pixel of the current frame with an accumulated stillness characteristic corresponding to a pixel location of the current pixel further comprises setting the accumulated stillness characteristic equal to zero when the frame stillness characteristic indicates that the current pixel is a non-still pixel.

15. A system for storing stillness information for a video stream having a plurality of fields each having a plurality of pixels, the system comprising:
a video buffer coupled to receive the video stream;
a still pixel detection system coupled to the video buffer and configured to generate a field stillness characteristic for a current pixel of a current field; and
a stillness accumulation unit coupled to receive the field stillness characteristic and configured to accumulate the field stillness characteristic with a corresponding accumulated stillness characteristic;
wherein the stillness accumulation unit further comprises a stillness accumulation adder coupled to read the accumulated stillness characteristic from the stillness accumulation buffer and to receive the field stillness characteristic, wherein the stillness accumulation adder is configured to add the field stillness characteristic to the accumulated stillness characteristic.

16. The system of claim 15, wherein the stillness accumulation unit further comprises a limiting circuit coupled to the stillness accumulation adder and configured to output the lesser of the value in the stillness accumulation adder and an accumulated stillness characteristic maximum value.

* * * * *